March 16, 1948. L. CARPENTIER 2,437,779
TOOLHOLDER
Filed Jan. 3, 1947
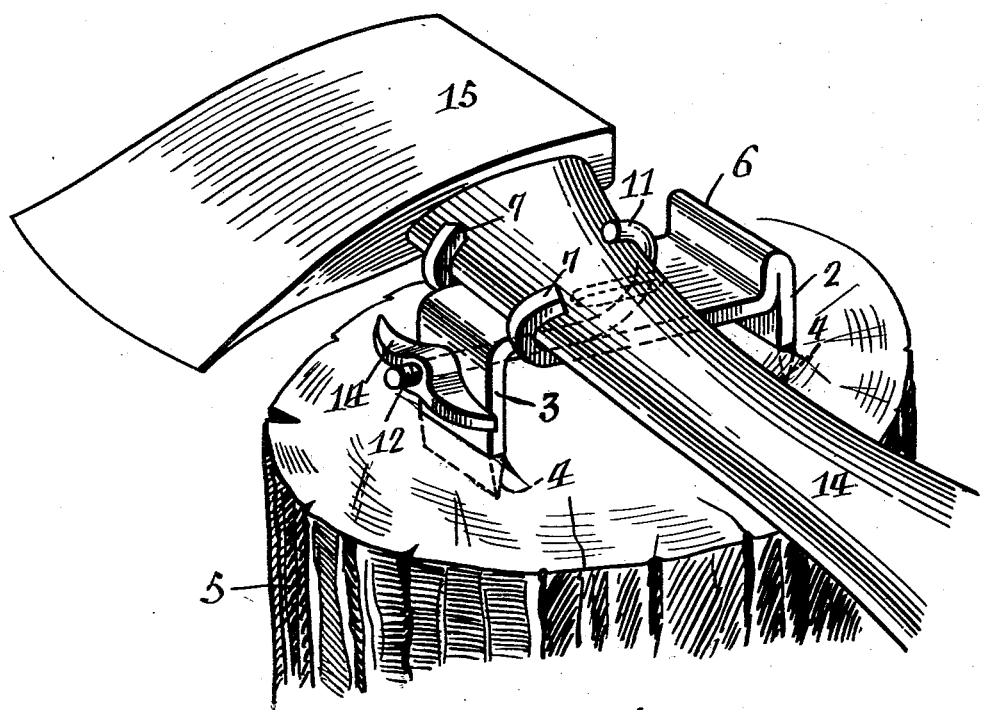
Fig.1
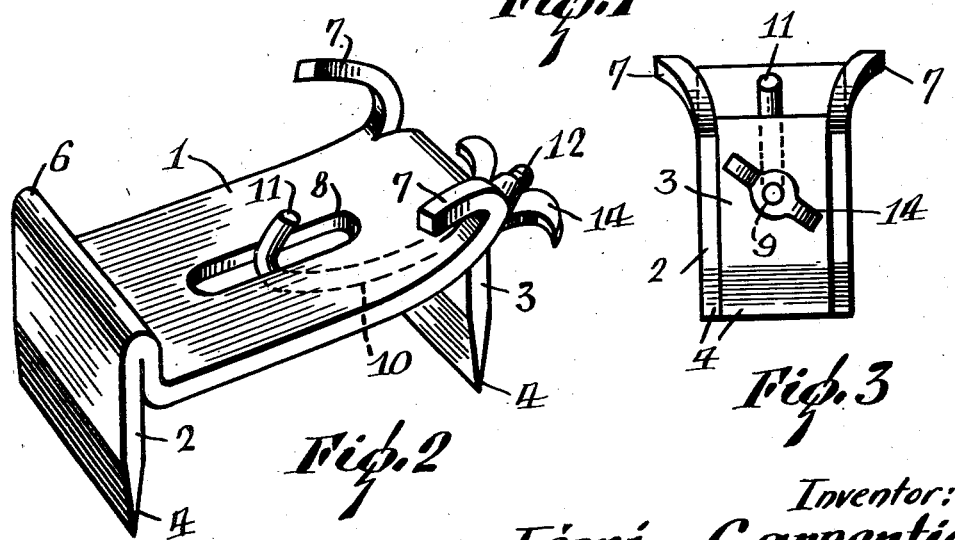
Fig.2
Fig.3
Inventor:
Léoni Carpentier
By [signature]
Attorney Patented Mar. 16, 1948

2,437,779

UNITED STATES PATENT OFFICE 2,437,779

TOOLHOLDER

Leoni Carpentier, Montreal, Quebec, Canada

Application January 3, 1947, Serial No. 720,049
In Canada January 9, 1946

6 Claims. (Cl. 51—218)

The present invention pertains to a novel tool holder and is designed particularly to clamp the handle of an axe while the head of the axe is being sharpened.

The principal object of the invention is to provide a simple and rugged device of this character capable of being set up and used in the woods and without the need of apparatus other than the simple tools carried by woodsmen. More specifically, the device is constructed to be driven into the stump of a tree by means of the blunt end of an axe head or by a hammer.

This object is accomplished by the provision of a U-shaped metal part having its sides sharpened at the ends so that it may be driven in inverted position in a tree stump or a block of wood. Adjacent to one side is formed a pair of hooks extending upwardly from the back or base of the inverted U-shaped member. These hooks are preferably formed by stripping the margins of the adjacent side, and are of such dimensions as to receive one edge of axe handle.

A grip or clamp on the opposite end of the handle is provided by means of an adjustable jaw member. This is in the form of a hook extending through a longitudinal slot in the back of the U-shaped member and having also a shank extending through the side which the hook faces. The extremity of the shank lying on the outer surface of the last named side is threaded and receives a wing nut bearing against that surface. Thus, the axe handle is first received loosely between the opposed hooks, and the adjustable hook is then drawn up tightly against its adjacent edge of the axe handle by adjustment of the wing nut.

The invention is fully disclosed by way of example in the following description and in the accompanying drawings in which:

Figure 1 is a perspective view showing the device of the invention in use;

Figure 2 is a perspective view of the device, and

Figure 3 is an end view.

Reference to these views will now be made by use of like characters which are employed to designate corresponding parts throughout.

As shown in Figures 1 and 2, the body of the device is an inverted U-shaped member comprising a base 1 and a pair of sides 2, 3 extending therefrom and having their ends sharpened at 4. The sharpened ends are in the nature of blades which are designed to be driven into a tree stump 5, as illustrated in Figure 1. The side 2, however, is doubled upwardly beyond the base 1 to form a bead 6 for a purpose that will presently be described.

The side 3 is somewhat narrower than the side 2, and the marginal metal at both ends is bent upwardly over the base 1 in the form of hooks 7. In the longitudinal center of the base 1 is formed a slot 8 lying perpendicular to the planes of the sides 2, 3.

In the side 3 is formed a hole 9 which receives one end of a stout pin or hook 10. The curved or hooked end 11 of the pin extends upwardly through the slot and is exposed above the base 1, as clearly shown in Figures 1 and 2.

The extremity of the pin which lies outward of the side 3 is threaded at 12 and receives a wing nut 13 bearing against the side 3, as better shown in Figure 1.

In the use of the device, the U-shaped member is driven into the stump 5 as already described, and the axe handle 14 is laid upon the base 1, with one edge thereof received beneath the hooks 7. The U-shaped member is so positioned on stump 5 that the axe head 15 lies beyond the periphery of the stump. Originally, the hook 11 lies beyond the other edge of the handle 14 so that the handle is readily received between this hook and the hooks 7. The member 10, 11 is thus drawn up by turning the wing nut 13 to tighten the axe handle in the position shown in Figure 1. The edge of the axe head 15 is then sharpened in the usual or any desired manner.

Although a specific embodiment of the invention has been illustrated and described, it will be understood that various alterations in the details of construction may be made without departing from the scope of the invention as indicated by the appended claims.

What I claim as my invention is:

1. A tool holder comprising an inverted U-shaped member having a base and sharpened sides for driving into a body of wood, a hook formed on said base and extending outwardly therefrom, said base having a slot perpendicular to the planes of said sides, a hook received in said slot and having a threaded free end extending through one of said sides, and a nut on said end and bearing against the outer surface of the last named side.

2. A tool holder comprising an inverted U-shaped member having a base and sharpened sides for driving into a body of wood, a pair of hooks formed at the edges of said base and extending outwardly therefrom, said base having a slot perpendicular to the planes of said sides, a hook received in said slot and having a threaded free end extending through one of said sides, and a nut on said end and bearing against the outer surface of the last named side.

3. A tool holder comprising an inverted U-shaped member having a base and sharpened sides for driving into a body of wood, a hook formed on said base and extending outwardly therefrom, said base having a slot perpendicular to the planes of said sides, a hook received in said slot and having a threaded free end extending through one of said sides, and a nut on said end and bearing against the outer surface of the last named side, one of said sides being shorter than the other.

4. A tool holder comprising an inverted U-shaped member having a base and sharpened sides for driving into a body of wood, the marginal material of one of said sides being bent upwardly in the form of hooks extending outwardly from said base, said base having a slot perpendicular to the planes of said sides, a hook received in said slot and having a threaded free end extending through one of said sides, and a nut on said end and bearing against the outer surface of the last named side.

5. A tool holder comprising an inverted U-shaped member having a base and sharpened sides for driving into a body of wood, a hook formed on said base and extending outwardly therefrom, said base having a slot perpendicular to the planes of said sides, a hook received in said slot and having a threaded free end extending through one of said sides, and a nut on said end and bearing against the outer surface of the last named side, the side opposite the first hook being doubled to form a bead extending outwardly from said base.

6. A tool holder comprising an inverted U-shaped member having a base and sharpened sides for driving into a body of wood, a pair of hooks formed at the edges of said base and extending outwardly therefrom, said base having a slot perpendicular to the planes of said sides, a hook received in said slot and having a threaded free end extending through one of said sides, and a nut on said end and bearing against the outer surface of the last named side, the side opposite said pair of hooks being doubled to form a bead extending outwardly from said base.

LEONI CARPENTIER.